United States Patent [19]

Li et al.

[11] Patent Number: 5,597,546
[45] Date of Patent: Jan. 28, 1997

[54] SELECTIVE OXIDATION OF HYDROGEN SULFIDE IN THE PRESENCE OF BISMUTH-BASED CATALYSTS

[75] Inventors: Kuo-Tseng Li; Min-Ya Huang; Wen-Da Cheng, all of Taichung, Taiwan

[73] Assignee: National Science Council, Taipei, Taiwan

[21] Appl. No.: 521,122

[22] Filed: Aug. 29, 1995

[51] Int. Cl.⁶ .................................................. B01D 53/52
[52] U.S. Cl. .................................... 423/573.1; 423/576.8; 423/230; 423/244.1
[58] Field of Search ................................ 423/230, 573.1, 423/576.8, 244.07, 244.1

[56] References Cited

U.S. PATENT DOCUMENTS

| | | | |
|---|---|---|---|
| 4,212,852 | 7/1980 | Aibe et al. | 423/230 |
| 4,444,908 | 4/1984 | Hass et al. | 502/247 |

FOREIGN PATENT DOCUMENTS

| | | | |
|---|---|---|---|
| 2702675 | 9/1994 | France | 423/230 |
| 1650225 | 5/1991 | U.S.S.R. | 423/230 |

OTHER PUBLICATIONS

J. A. Lagas and J. Borsboom, "Selective–oxidation catalyst improves Claus process", *Oil and Gas Journal,* 86(41), pp. 68–71, (Oct. 10, 1988).

P. F. M. T. van Nisselrooy and J. A. Lagas, "SuperClaus reduces $SO_2$ emission by the use of a new selective oxidation catalyst", *Catalysis Today,* 16, pp. 263–271, 1993. (No month).

*Primary Examiner*—Gary P. Straub
*Assistant Examiner*—Timothy C. Vanoy
*Attorney, Agent, or Firm*—Hitt Chwang & Gaines

[57] ABSTRACT

The present invention discloses a method of selectively oxidizing hydrogen sulfide to elemental sulfur, in which a $H_2S$-containing gas mixture contacts with an oxygen-containing gas at 50°–500° C. in the presence of a bismuth-based catalyst. The reaction product mixture contains substantially no sulfur dioxide. The bismuth-based catalyst may further contain molybdenum or vanadium atom.

2 Claims, No Drawings

SELECTIVE OXIDATION OF HYDROGEN SULFIDE IN THE PRESENCE OF BISMUTH-BASED CATALYSTS

FIELD OF THE INVENTION

The present invention relates to a process for recovering elemental sulfur by selectively oxidizing hydrogen sulfide to elemental sulfur, and in particular to a novel catalyst used therein.

BACKGROUND OF THE INVENTION

In the petroleum refinery processes for producing various fuel oils such as gasoline, diesel and kerosene, etc., the sulfur contained in the crude oils is removed as hydrogen sulfide gas by hydrodesulfurization process. The highly toxic hydrogen sulfide gas is then converted to elemental sulfur in sulfur-recovery plants or so-called Claus plants. The Claus plants can be blamed for part of the hydrogen sulfide emissions, as the sulfur-recovery rate is 90–98% depending on the number of reactors used therein. During the last two decades a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is expensive, both in terms of capital investment cost and energy consumption. In order to avoid the shortcoming of these solution-absorption type Claus TGT processes, a dry type Claus TGT process has been developed in Netherlands which comprises recovering elemental sulfur from the Claus tail gas by selective oxidation of hydrogen sulfide in the presence of a catalytically active mixture of iron and chromium oxides deposited on an alpha-alumina support [Oil and Gas Journal, 86(41), p. 68–71, (Oct. 10,1988); Catalysis Today, 16, p. 263–271, 1983]. The dry type Claus TGT process is simple and economical; however, the chromium atom contained in the catalyst is a toxic substance.

The primary objective of the present process is to provide a process for recovering elemental sulfur from a gas mixture containing hydrogen sulfide by selective oxidation of hydrogen sulfide in the presence of a bismuth-containing catalyst.

DETAILED DESCRIPTION OF THE INVENTION

The possible reactions between hydrogen sulfide and oxygen are as follows:

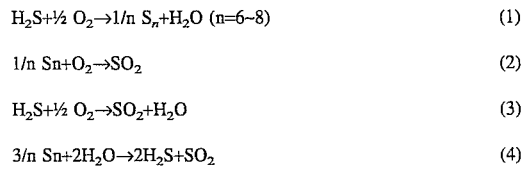

In the presence of an appropriate catalyst, such as the iron/chromium oxides used in the prior art [Oil and Gas Journal, 86(41), p. 68–71, (Oct. 10,1988); Catalysis Today, 16, p. 263–271, 1993], the reaction (1) will take place while the reactions (2) to (4) are inhibited, i.e. the hydrogen sulfide is selectively oxidized to elemental sulfur, wherein the hydrogen sulfide is converted with a high selectivity into elemental sulfur, while the formation of sulfur dioxide ($SO_2$) is very small even in the presence of an overstoichmetric amount of oxygen.

The present invention discloses a novel catalyst suitable for selective oxidation of hydrogen sulfide to elemental sulfur, which comprises bismuth atom, and preferably vanadium or molybdenum atom.

The present invention also discloses a process for recovering elemental sulfur from a gas mixture containing hydrogen sulfide, which comprises contacting said gas mixture with an oxygen-containing gas at an elevated temperature in the present of a catalyst, wherein the improvement comprises said catalyst comprising bismuth atom.

Preferably, said catalyst further comprises vanadium atom or molybdenum atom, wherein the molar ratio of bismuth atom to vanadium or molybdenum atom ranges from 1:100 to 100:1, preferably 1:10 to 10:1.

The catalyst used in the present process may be a metal, metal oxide, metal sulfide, or metal salt, which can be in the form of monolith, particle or pellet, or deposited on a porous carrier selected from the group consisting of alumina, silica and zeolite.

Said elevated temperature of the present process ranges from 50° C. to 400° C., preferably from 100° C. to 350° C.

Pressure has no significant effect on the present process. A suitable pressure for contacting said gas mixture with said oxygen-containing gas in the present process is about 1–10 arm.

Said oxygen-containing gas used in the present process includes (but not limited to) air, oxygen-enriched air, and pure oxygen. Preferably air is used as the oxygen-containing gas.

Said gas mixture containing hydrogen sulfide used in the present process has no limitation on the hydrogen sulfide concentration. However, in the SuperClaus-99 process the hydrogen sulfide concentration contained in the tail gas is controlled at 0.8–3 vol % [Oil and Gas Journal, 86(41), p. 68–71, (Oct. 10,1988); Catalysis Today, 16, p. 263–271, 1993].

The stoichmetric ratio of hydrogen sulfide to oxygen in the reaction (1) is 2:1. Preferably, in the present process said gas mixture is contacted with said oxygen-containing gas with a molar ratio of hydrogen sulfide to oxygen less than 2, i.e. with an overstoichmetric amount of oxygen.

The invention will be further illustrated by the following examples. The following examples are only meant to illustrate the invention, but not to limit it.

EXAMPLES

Preparation of Catalysts

Control Example 1: Molybdenum Oxide

To 25 ml of distilled water 12.35 g (0.01 mole) of ammonium molybdate [$(NH_4)_6Mo_7O_{24} \cdot 4H_2O$, manufactured by Riedel-de Haën, Germany], and then nitric acid was added to the resulting solution to maintain the pH value thereof at 1.5 and to yield a Mo metal salt precipitation therein. The solution/precipitation mixture was kept in room for 24 hours, and the precipitation was removed by filtration, and dried at 150° C. for 4 hours. Finally the dried precipitation was calcined at 400° C. for 8 hours to obtain molybdenum oxide catalyst.

Control Example 2: Bismuth Oxide

Bismuth nitrate [$Bi(NO_3)_3 \cdot 5H_2O$, available from Showa Chemicals, Inc., Japan] was calcined at 500° C. for 8 hours to yield bismuth oxide catalyst.

Control Example 3: Vanadium Oxide

Ammonium vanadate powder [$NH_4VO_3$ purchased from Showa Chemicals, Inc., Japan] was calcined at 550° C. for 3 fours to form orange powder which was then pressed and screened to obtain particles of 10–20 mesh number.

EXAMPLE 1

Bismuth and Molybdenum Mixed-Oxide Catalyst (a) To a mixture of bismuth nitrate (9.702 g, 0.02 mole) and 60% nitric acid solution (10 ml) 400 ml of distilled water was added. The resulting solution was kept in room for 24 hours.

(b) To a solution of ammonium molybdate (5.3 g, 0.0043 mole) in distilled water (66.7 ml), nitric acid was added until the pH value reached 1.5. The resulting solution was kept in room for 24 hours.

(c) The solution prepared in the step (a) was added dropwise to the solution prepared in the step (b), and the pH value of the resultant mixed solution was adjusted to 1.5 by adding $NH_4OH$ (28%) aqueous solution.

(d) White solid precipitation was obtained by filtration of the mixed solution in the step (c). The precipitate was dried at 150° C. for 12 hours, and calcined at 200° C. for 4 hours followed by 500° C. for 20 hours to yield a gray powder mixture of bismuth and molybdenum oxides.

EXAMPLE 2

Bismuth and Vanadium Mixed-Oxide Catalyst (a) To a mixture of bismuth nitrate (8.29 g, 0.0171 mole) and 60% nitric acid solution (6 ml) 54 ml of distilled water was added. The resulting solution was kept in a titration tube.

(b) 2 g (0.0171 mole) of ammonium vanadate ($NH_4VO_3$) was dissolved in 100 ml of distilled water, and the resulting solution was kept in another titration tube.

(c) The solutions prepared in the steps (a) and (b) were added dropwise to 40 ml of 0.1N aqueous oxalic acid solution while stirring, in which the temperature was maintained at 80° C. The stir was continued until a precipitation paste was formed in the mixture.

(d) The precipitation paste was removed from the mixture and dried at 100° C. for 12 hours, and calcined at 500° C. for 8 hours to yield a mixture of bismuth and vanadium oxides having a molar ratio of Bi:V=1:1.

The steps (a)–(d) were repeated to yield two mixtures of bismuth and vanadium oxides having molar ratios of Bi:V= 2:1 and 1:2 except that the amount of bismuth nitrate was changed.

Selective Oxidation of Hydrogen Sulfide

EXAMPLE 3

A continuous fixed bed reactor having an inner diameter of 7 mm, an outer diameter of 9 mm and a length of 80 cm was used in this example. Catalyst in the form of 10–20 mesh number particles was packed into the reactor, in which quartz sand was filled at the feed end of the catalyst bed to form a preheating zone. The reaction temperature was controlled by electrical heaters installed around the reactor. The catalyst bed was pre-sulfurized for 12 hours or longer by introducing a high concentration hydrogen sulfide gas mixture into the reactor at an elevated temperature until a gaseous reaction product leaving the reactor had a stable hydrogen sulfide concentration. A gaseous feed stream consisting of 1 vol % hydrogen sulfide, 5 vol % oxygen and 94 vol % nitrogen was then introduced into the reactor at 100 ml/min.. The reaction product exiting the reactor was introduced into a gas-solid separator which was maintained at 25° C., in which the reaction product was separated into a solid product and a gaseous product. The composition of the gaseous product was analyzed by a HP5890 gas chromatography with a 9 feet long Porapak Q80/100 mesh S.S. coiled column.

The reaction conditions and results are listed in Tables 1–5, in which the conversion (%) is defined as the mole of hydrogen sulfide reacted per mole of hydrogen sulfide in the feed stream, and the selectivity is defined as the mole of elemental sulfur formed per mole of the reacted hydrogen sulfide, which can be calculated as follows:

$$\text{Conversion (\%)} = \frac{H_2S \text{ feeding rate (mole/min.)} - H_2S \text{ exiting rate (mole/min.)}}{H_2S \text{ feeding rate (mole/min.)}} \times 100\%$$

$$\text{Selectivity (\%)} = \frac{\text{elemental sulur formation rate (mole/min.)}}{H_2S \text{ feeding rate (mole/min.)} - H_2S \text{ exiting rate (mole/min.)}} \times 100\%$$

The elemental sulfur formation rate (mole/min.) is equal to the hydrogen sulfide feeding rate (mole/min.) subtracts the exiting rate (mole/min.) of hydrogen sulfide and subtracts the exiting rate (mole/min.) of sulfur dioxide in the gas product.

TABLE 1

| Molybdenum oxide catalyst prepared in the Control Example 1 (amount of catalyst used: 2 g) | | |
|---|---|---|
| Temperature (°C.) | Conversion (%) | Selectivity (%) |
| 190 | 9.6 | 100 |
| 200 | 10.4 | 100 |
| 210 | 11.6 | 100 |
| 220 | 17.1 | 100 |
| 240 | 23.0 | 100 |
| 250 | 28.4 | 100 |
| 260 | 38.5 | 83.6 |
| 270 | 61.5 | 55 |

TABLE 2

| Bismuth oxide catalyst prepared in the Control Example 2 | | |
|---|---|---|
| Temperature (°C.) | Conversion (%) | Selectivity (%) |
| Amount of catalyst used: 2 g | | |
| 210 | 21 | 100 |
| 220 | 26 | 100 |
| 230 | 42 | 100 |
| 240 | 77 | 100 |
| 250 | 94 | 100 |
| Amount of catalyst used: 0.5 g | | |
| 200 | 5.6 | 100 |
| 210 | 12 | 100 |
| 230 | 15 | 100 |
| 240 | 19 | 100 |
| 260 | 34 | 100 |
| 280 | 72 | 100 |
| 290 | 85 | 80 |

TABLE 3

Vanadium oxide catalyst prepared in the Control Example 3
(amount of catalyst used: 0.5 g)

| Temperature (°C.) | Conversion (%) | Selectivity (%) |
|---|---|---|
| 200 | 76 | 100 |
| 210 | 78 | 100 |
| 220 | 81 | 88 |

TABLE 4 bismuth and molybdenum mixed-oxide catalyst prepared in the Example 1
(amount of catalyst used: 0.5 g)

| Temperature (°C.) | Conversion (%) | Selectivity (%) |
|---|---|---|
| 200 | 40 | 100 |
| 210 | 45 | 100 |
| 220 | 60 | 100 |
| 230 | 65 | 100 |
| 240 | 81 | 96 |

TABLE 5 bismuth and vanadium mixed-oxide catalyst prepared in the Example 2
(amount of catalyst used: 0.5 g)

| Temperature (°C.) | Conversion (%) | Selectivity (%) |
|---|---|---|
| Molar ratio of Bi:V = 1:1 | | |
| 200 | 46.2 | 100 |
| 210 | 55.3 | 100 |
| 220 | 64.8 | 100 |
| 240 | 79.1 | 100 |
| 250 | 85.0 | 100 |
| 260 | 97.02 | 100 |
| Molar ratio of Bi:V = 2:1 | | |
| 200 | 94.52 | 100 |
| 210 | 96.78 | 88.2 |
| Molar ratio of Bi:V = 1:2 | | |
| 200 | 49.83 | 100 |
| 210 | 55.91 | 100 |
| 220 | 76.98 | 100 |

TABLE 5-continued bismuth and vanadium mixed-oxide catalyst prepared in the Example 2
(amount of catalyst used: 0.5 g)

| Temperature (°C.) | Conversion (%) | Selectivity (%) |
|---|---|---|
| 230 | 90.32 | 100 |
| 240 | 90.79 | 86.3 |

The data in Tables 1–5 show that both the mixed oxides of bismuth-molybdenum and the mixed oxides of bismuth-vanadium have better catalytic performances for the selective oxidation of $H_2S$ to elemental sulfur in comparison with the catalysts containing only single metal oxide. In particular, the mixed oxides of bismuth-vanadium has the best yield of elemental sulfur, which is significantly higher than those of the single oxide of bismuth or the single oxide of vanadium. This indicates that the incorporation of vanadium atom to the bismuth oxide catalyst has strong synergistic catalytical effects for the selective oxidation reaction of $H_2S$ to elemental sulfur.

What is claimed is:

1. A process for selectively oxidizing hydrogen sulfide to elemental sulfur from a gas mixture containing from about 0.8 to about 3 volume percent of said hydrogen sulfide, said process consisting the steps of:

forming a solution of bismuth and molybdenum salts;

precipitating said solution with a hydroxide to obtain a precipitate having bismuth and molybdenum in a molar ratio of not greater than about 5 to 1;

separating and calcinating said precipitate to the corresponding oxides;

presulfurizing said corresponding oxides; and contacting said presulfurized oxides with said gas mixture in the presence of a gaseous feed stream containing an overstoiehmetric amount of oxygen at a temperature of from about 100° C. to about 350° C.

2. A process according to claim 1, wherein said corresponding oxides are in the form of monolith, particle or pellet.

* * * * *

UNITED STATES PATENT AND TRADEMARK OFFICE
CERTIFICATE OF CORRECTION

PATENT NO. : 5,597,546
DATED : January 28, 1997
INVENTOR(S) : Li et al.

It is certified that error appears in the above-indentified patent and that said Letters Patent is hereby corrected as shown below:

Col. 1, line 38, delete "1983]." and insert therefore -- 1993]. --.

Col. 2, line 27, delete "arm." and insert therefore -- atm. --.

Col. 2, line 55, delete "[(NH$_4$)$_6$Mo$_7$O$_{24}$.4H$_2$O," and insert therefore -- [(NH$_4$)$_6$Mo$_7$O$_{24}$·4H$_2$O, --.

Col. 2, line 65, delete "[Bi(NO$_3$)$_3$.5H$_2$O," and insert therefore -- [Bi(NO$_3$)$_3$·5H$_2$O, --.

Col. 4, line 20, in the formula, delete

"$\underline{\frac{H_2S \text{ feeding rate (mole/min.)} - H_2S \text{ exiting rate (mole/min.)}}{H_2S \text{ feeding rate (mole/min.)}}} \times 100\%$"

and insert therefore

-- $\underline{\frac{H_2S \text{ feeding rate (mole/min.)} - H_2S \text{ exiting rate (mole/min.)}}{H_2S \text{ feeding rate (mole/min.)}}} * 100\%$ --.

UNITED STATES PATENT AND TRADEMARK OFFICE
CERTIFICATE OF CORRECTION

PATENT NO. : 5,597,546
DATED : January 28, 1997
INVENTOR(S) : Li et al.

It is certified that error appears in the above-indentified patent and that said Letters Patent is hereby corrected as shown below:

Col. 4, line 25, in the formula, delete

"$$\frac{\text{elemental sulur formation rate (mole/min.)}}{\text{H}_2\text{S feeding rate (mole/min.)} - \text{H}_2\text{S exiting rate (mole/min.)}} \times 100\%$$"

and insert therefore

"$$\frac{\text{elemental sulur formation rate (mole/min.)}}{\text{H}_2\text{S feeding rate (mole/min.)} - \text{H}_2\text{S exiting rate (mole/min.)}} *100\%$$ --.

Col. 6, line 38, delete "overstoiehmetric" and insert therefore -- overstoichmetric --.

Signed and Sealed this

First Day of July, 1997

Attest:

BRUCE LEHMAN

*Attesting Officer*    *Commissioner of Patents and Trademarks*